(12) United States Patent
Scheufler et al.

(10) Patent No.: US 11,262,204 B2
(45) Date of Patent: Mar. 1, 2022

(54) VEHICLE MOVEMENT AUTHORIZATION

(71) Applicant: Ford Global Technologies, LLC, Dearborn, MI (US)

(72) Inventors: Nicholas Alexander Scheufler, Flat Rock, MI (US); David A. Herman, Southfield, MI (US); Nunzio Decia, Northville, MI (US); Stephen Jay Orris, Jr., New Boston, MI (US); David Joseph Orris, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 16/328,004

(22) PCT Filed: Aug. 31, 2016

(86) PCT No.: PCT/US2016/049571
§ 371 (c)(1),
(2) Date: Feb. 25, 2019

(87) PCT Pub. No.: WO2018/044285
PCT Pub. Date: Mar. 8, 2018

(65) Prior Publication Data
US 2019/0195644 A1    Jun. 27, 2019

(51) Int. Cl.
*G01C 21/34*  (2006.01)
*B60R 25/24*  (2013.01)
(Continued)

(52) U.S. Cl.
CPC ........ *G01C 21/3438* (2013.01); *B60R 25/241* (2013.01); *B60W 50/08* (2013.01);
(Continued)

(58) Field of Classification Search
CPC .... G01C 21/3438; G01C 21/36; G01C 21/00; G01C 21/12; G01C 21/26; G01C 21/34;
(Continued)

(56) References Cited

U.S. PATENT DOCUMENTS

2009/0326799 A1   12/2009   Crook
2014/0125502 A1   5/2014    Wittkop et al.
(Continued)

FOREIGN PATENT DOCUMENTS

KR   1020150132045 A   11/2015
WO   2015099679 A1     7/2015
(Continued)

OTHER PUBLICATIONS

Notification Concerning Transmittal of International Preliminary Report on Patentability regarding International Application No. PCT/US2016/049571 dated Mar. 14, 2019 with Written Opinion of the International Searching Authority and International Search Report (16 pages).

*Primary Examiner* — Anthony R Jimenez
(74) *Attorney, Agent, or Firm* — Brandon Hicks; Bejin Bieneman PLC

(57) ABSTRACT

Data to initiate movement of a vehicle is received from a first user. The first user is identified. A determination is made whether to initiate the movement of the vehicle based at least in part on the data and the one or more characteristics of the first user. The movement of the vehicle is initiated.

19 Claims, 7 Drawing Sheets

(51) Int. Cl.
  *G06F 21/60* (2013.01)
  *B60W 50/08* (2020.01)
  *G05D 1/02* (2020.01)
  *H04L 29/06* (2006.01)

(52) U.S. Cl.
  CPC ......... *G05D 1/0212* (2013.01); *G05D 1/0276* (2013.01); *G06F 21/604* (2013.01); *H04L 63/105* (2013.01); *B60W 2540/043* (2020.02); *B60W 2556/50* (2020.02); *G05D 2201/0212* (2013.01)

(58) Field of Classification Search
  CPC .. B60R 25/241; G05D 1/0212; G05D 1/0276; G05D 2201/0212; G06F 21/604; G06F 3/048; H04L 63/105; B60W 2540/043; B60W 2556/50; B60W 50/08; B60W 40/00; B60W 40/08; B60W 40/0809; G06Q 10/00; G08B 21/22; G07C 9/00; G07C 9/00087; G08G 1/0968; G08G 1/096805; G08G 1/096827; G08G 1/096844; G08G 1/00; G08G 1/015; G08G 1/017; G08G 1/127
  USPC .......................................................... 701/25
  See application file for complete search history.

(56) References Cited

U.S. PATENT DOCUMENTS

| | | |
|---|---|---|
| 2015/0149023 A1 | 5/2015 | Attard et al. |
| 2015/0363986 A1 | 12/2015 | Hoyos et al. |

FOREIGN PATENT DOCUMENTS

| | | |
|---|---|---|
| WO | 2015157974 A1 | 10/2015 |
| WO | 2015157975 A1 | 10/2015 |
| WO | 2015157977 A1 | 10/2015 |

VEHICLE MOVEMENT AUTHORIZATION

BACKGROUND

An autonomous vehicle operates according to instructions from a computer controller, and without intervention of a user. Thus, the vehicle may operate, e.g., travel along a planned route, with or without occupants. In some cases, occupants may be persons unable to operate the vehicle, such as minor children. An autonomous vehicle can be shared among multiple users, e.g., as part of a car sharing fleet or public transport system. Thus, various users in an autonomous vehicle may be traveling to a same destination or to different destinations, and may have different abilities. However, the autonomous vehicle, e.g., when operating as a public transport, may lack an operator to make decisions about control, and to control, the vehicle. Problems arise where an autonomous vehicle controller is unaware of what occupants are in a vehicle, and capacities of such occupants, before navigation begins, or as the vehicle traverses a route.

DETAILED DESCRIPTION

Introduction

An autonomous vehicle controller, i.e., a vehicle computer, can monitor operation of the vehicle. For example, the controller can store a route having segments. The controller can further store a list of zero or more expected occupants for each segment of the route, along with start and end locations for each segment. The computer can identify users entering or in the vehicle, e.g., using known authentication techniques such as a PIN code, username and password, biometric data such as facial recognition, etc. A user's planned destination may be stored prior to the user entering the vehicle, or may be provided by the user upon entering the vehicle. A user may be associated with a role giving the user permissions for various operations in the vehicle, including to provide input to initiate movement of the vehicle, e.g., to authorize the vehicle computer to begin operation of the vehicle according to a next route segment.

System Elements

Figure 1:
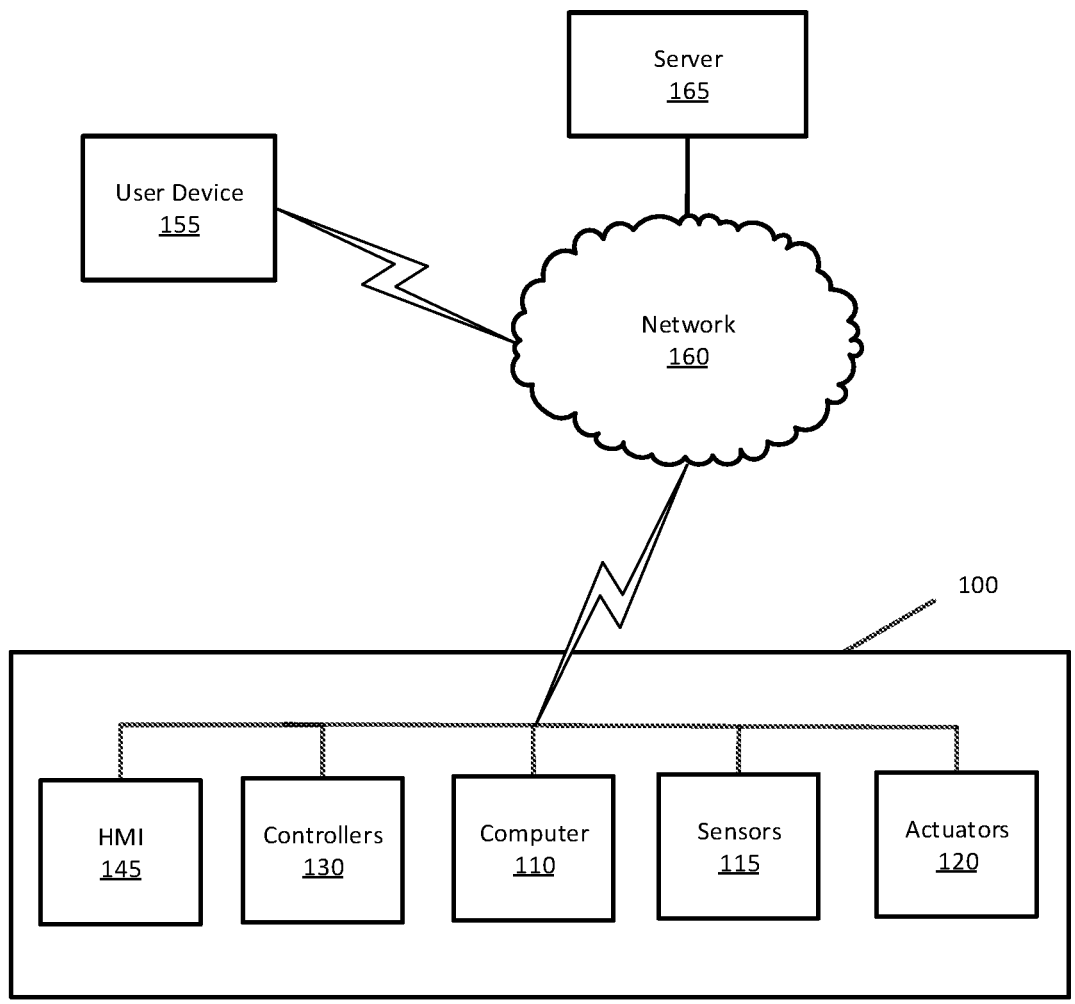
FIG. 1 is a block diagram of an exemplary system for monitoring an operation of an autonomous vehicle shared among multiple users along a planned route.

FIG. 1 illustrates an example vehicle 100 including a computer 110 that is programmed to receive input data from a first user to initiate movement of the autonomous vehicle and identify the first user. The computer 110 is further programmed to determine, based at least in part on the input data and the characteristics of the first user, to initiate movement of the vehicle. The characteristics of users are according to the roles and permissions that are defined and implemented as described herein.

The vehicle 100 may be powered in variety of known ways, e.g., with an electric motor and/or internal combustion engine. The vehicle 100 includes the computer 110, sensors 115, actuators 120, a human machine interface (HMI) 145, and other components discussed herein below.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one other computing devices, e.g., controllers 130 or the like included in the vehicle for monitoring and/or controlling various vehicle components, e.g., controllers 130 can include a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., controllers, actuators, sensors, etc., including sensors 115. Alternatively or additionally, in cases where the computer 110 actually comprises multiple devices, the vehicle communication network may be used for communications between devices represented as the computer 110 in this disclosure. Further, as mentioned below, various controllers and/or sensors 115 may provide data to the computer 110 via the vehicle communication network.

In addition, the computer 110 may be configured for communicating through a vehicle-to-infrastructure (V-to-I) interface with a server 165 via a network 160. The network 160 represents one or more mechanisms by which the user devices 155, the computer 110, and the server 165 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), dedicated short range communications (DSRC), local area networks (LAN) and/or wide area networks (WAN), including the Internet, providing data communication services.

As already mentioned, generally included in instructions stored in the memory and executed by the computer 110 is programming for operating one or more vehicle components, e.g., braking, steering, propulsion, etc., without intervention of a human operator. Using data received in the computer 110, e.g., the sensor data from the sensors 115, the server 165, etc., the computer 110 may make various determinations and/or control various vehicle components and/or operations without a driver to operate the vehicle. For example, the computer 110 may include programming to regulate vehicle operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location, intersection (without signal) minimum time-to-arrival to cross the intersection, etc.

Controllers 130, as that term is used herein, are processors that typically are programmed to control a specific vehicle subsystem. Examples include a powertrain controller, a brake controller, and a steering controller. A controller may be an electronic control unit (ECU) such as is known, possibly including additional programming as described herein. The controllers may communicatively be connected to and receive instructions from the computer 110 to actuate the subsystem according to the instructions. For example, the brake controller may receive instructions from the computer 110 to operate the brakes of the vehicle.

Sensors 115 may include a variety of devices known to provide data via the vehicle communications bus. For example, the sensors 115 may include one or more cameras, radars, or Light Detection and Ranging (LIDAR) sensors disposed in the vehicle 100 providing data encompassing at least some of the vehicle interior, exterior, or both. The data may be received by the computer 110 through a suitable interface such as in known. The computer 110 may authenticate users based on the received data.

Further, the sensors 115 may include microphones disposed in the vehicle, e.g., the interior or a trunk, providing audio data. For example, the computer 110 may communicate with a user to, e.g., identify the user of the vehicle 100, e.g., using voice recognition techniques.

The sensors 115 may include a GPS (global positioning system) device. The GPS sensor may transmit a current geographical coordinate of the vehicle 100 via the vehicle communication network, e.g., vehicle 100 bus. For example, the computer 110 may prohibit navigation of the vehicle 100, e.g., for one or more specific user roles, to any location outside a predetermined geo-fenced area, or a predetermined distance from a home location, etc. The geo-fenced area may be a geographical area identified by geographical coordinates of corners or boundaries of the geo-fenced area such as is known.

The actuators 120 are implemented via circuits, chips, or other electronic components that can actuate various vehicle subsystems in accordance with appropriate control signals as is known. For instance, the actuators 120 may be implemented via one or more relays, servomotors, etc. The actuators 120, therefore, may be used to control braking, acceleration, and steering of the host vehicle 100. Additionally, the actuators 120 may control access to the vehicle 100, e.g., release/lock doors, or components of the vehicle 100, e.g., release/lock multimedia access. The control signals used to control the actuators 120 may be generated by the computer 110, a control unit located in the vehicle 100, e.g., the brake controller, etc.

The human-machine interface (HMI) 145 can include a touch screen, an interactive voice response (IVR) system, and/or other input/output mechanisms such as are known, and can receive input data from a user and/or outputs data to the user. For example, the HMI 145 may have a soft key or a push button to initiate movement of the vehicle 100.

A user device 155 may communicate with the computer 110 via the network 160. The user device 155 may be a smartphone or wearable computer communicating via the network 160. The user device 155 may include input mechanisms to, e.g., input a PIN code, initiate a movement of the vehicle, etc., and output mechanisms to, e.g., output a visual and/or audio information to the user. The computer 110 may determine a location of the user device 155 via e.g., a GPS device or a short range communication interface included in the user device.

The server 165 is a remote computer or computers communicating with the computer 110 via the network 160, e.g., LTE.

Figure 2:
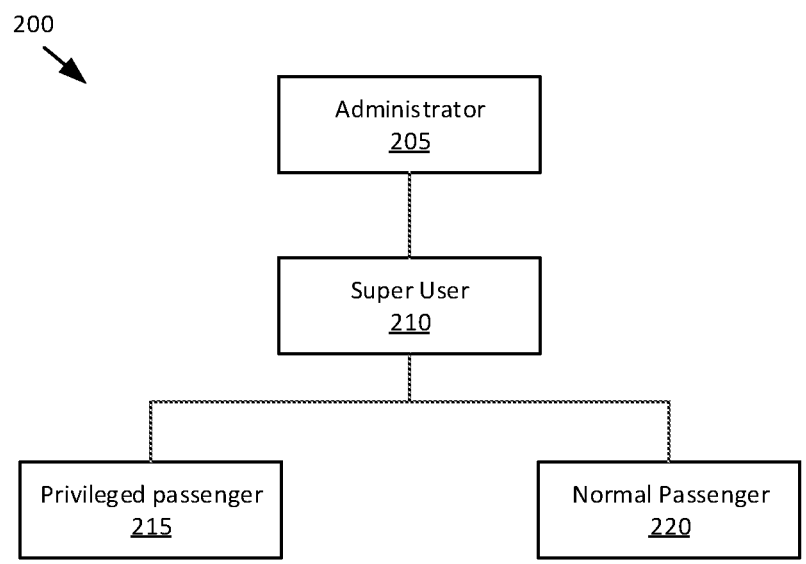
FIG. 2 is a block diagram showing a hierarchy of roles associated with vehicle users.

FIG. 2 illustrates a variety of roles to be associated with respective vehicle users in an example implementation. Each role corresponds to a category of vehicle user, and, as discussed below, includes permissions established for the category of user.

As shown in FIG. 2, the roles may be defined in a hierarchy 200. Roles at higher levels in the hierarchy 200 typically have greater permissions than roles at lower levels. "Permissions," as that term is used herein, includes different combinations of rights to access, e.g., view, vehicle components and/or make modifications to settings thereof. That is, a permission specifies whether a user request for controlling one or more vehicle 100 components should be granted or denied. For example, a "viewing permission" (interchangeably referred to as an "access permission") is a permission to view a status or a configuration of a vehicle 100 component or operation thereof, e.g., via the HMI 145. A "modifying permission" is a permission to make a change to a status or configuration of a vehicle 100 component or the operation thereof. A request to control is a user input to view certain information or modify a setting or status of a vehicle 100 component.

Thus, the permissions may include viewing or modifying permissions associated with one or more vehicle 100 components such as:
- an entertainment system, e.g., to select a radio station, play media from another device such as a smartphone, etc.;
- a navigation system, e.g., to view/set a destination, view/set a route;
- a climate control system e.g., to view/modify a cabin thermostat setting, etc.;
- a virtual driver, e.g., initiate controls such as initiating a movement of a vehicle 100.

Permissions and the association of permissions to a role are discussed further below in greater detail.

A user may be assigned to a role based on one or more attributes of the user. In the present context, a user attribute is a characteristic attributable to a category of people, e.g., a user age, relationship to a vehicle 100 owner (e.g., family member, spouse, etc.), driving ability (e.g., licensed or unlicensed), paid or ticketed status for a current vehicle 100 route or route segment, user relationship to a car sharing company operating a vehicle 100 (e.g., the user could be an employee of car sharing company), etc. For example, roles, i.e., different sets of permissions, could be assigned based on user attributes. A relationship among various roles may be hierarchical as shown in the hierarchy 200. In a hierarchical relationship, a first role may have a superset (i.e., a greater number) of permissions than a second role below the first role in the hierarchy.

Examples roles include administrator 205, super user 210, privileged passenger 215, and normal passenger 220.

Example of some of the permissions assigned to each of these roles are illustrated in the following table:

TABLE 1

|  | Administrator | Super user | Privileged passenger | Normal Passenger |
|---|---|---|---|---|
| Create/delete users and/or user groups | ✓ | | | |
| Edit permissions associated with a user and/or user group | ✓ | | | |
| Authorize maintenance | ✓ | ✓ | | |
| View destinations and routes | ✓ | ✓ | ✓ | ✓ |
| Enter/modify destinations and routes locally | ✓ | ✓ | ✓ | |
| Enter/modify destinations and routes remotely | ✓ | ✓ | | |
| View geo-fenced areas | ✓ | ✓ | ✓ | ✓ |
| Enter/modify geo-fenced areas | ✓ | ✓ | | |
| View vehicle settings | ✓ | ✓ | ✓ | ✓ |
| Modify vehicle settings | ✓ | ✓ | ✓ | |
| Authorize an initiation of travel locally | ✓ | ✓ | ✓ | |
| Authorize an override of initiation of travel remotely | ✓ | | | |
| Authorize an initiation of travel remotely | ✓ | ✓ | | |
| Enter/Modify route plan | ✓ | ✓ | | |

In the hierarchical hierarchy 200, a role such as privileged passenger 215 may have a subset, i.e., some but not all, of the permissions associated with a super user 210. Alternatively, the roles may be defined in other relationships to one another. For example, roles in alternative arrangements to the example hierarchy 200 may have overlapping set of permissions but are not necessarily in a hierarchical relationship to one another.

In the present example hierarchy 200, the administrator 205 has a greater number of permissions than any other roles. As an example, an owner of the vehicle 100 may be associated with the administrator 205 role. An entity such as a vehicle dealer or a government agency may, when a vehicle 100 is sold and/or put into service, associate an entity or a person, e.g., an owner, with the administrator 205 role. For example, the entity may maintain electronic data, e.g., an electronic vehicle title document, on the server 165 which indicates the identity of the administrator 205 of the vehicle 100. The entity may provide to be stored in the computer 110 memory information for the administrator 205 to be authenticated via the HMI 145 in a known manner, e.g., by recording authentication information for biometric authentication, by providing an administrator under name and password, etc. Alternatively, an entity like a car sharing facility or an original equipment manufacturer (OEM) may be associated with the administrator 205 role, e.g., when a car is leased or rented.

A super user 210 may have a subset (which in the present context means "a lower number") of permissions assigned to the administrator 205. As one example, a super user 210 may not have the permission to add a user group to the vehicle 100 whereas the administrator 205 does have such permission.

An administrator 205 or a super user 210 can, in the present example, enter or modify a route plan to share a vehicle 100 along a route among multiple users. The multiple users could include one or such as privileged passengers 215 and/or normal passengers 220. A route may include multiple segments, each segment starting from a location and ending at the start location of a next segment or an end address. Zero or more users are assigned to each segment. A user may be assigned to one or more segments, i.e., one user may stay in the vehicle 100 while other users enter or exit the vehicle 100. A user associated with a route segment may be referred to as an authorized user for the route segment. An example of a route plan having a list of authorized users for each of the route segments is illustrated in the following table:

TABLE 2

|  | Location | User 1 | User 2 | User 3 |
|---|---|---|---|---|
| First Segment | First Address | ✓ | | |
| Second Segment | Second Address | ✓ | | |
| Third Segment | Third Address | ✓ | ✓ | |
| Fourth Segment | Fourth Address | | | |
| Fifth Segment | Fifth Address | | | ✓ |
| End | Sixth Address | | | |

A privileged passenger 215 or normal passenger 220 may have a subset of permissions of the super user 210. For example, a privileged passenger 215 may have permissions to initiate a movement of the vehicle 100 (e.g., at a beginning location of each segment of a route). A normal passenger 220 may be restricted from various permissions granted to the privileged passenger 215. For example, the normal passenger 220 may not have permission to set a destination or waypoint of a route of the vehicle 100. In another possible example, the normal passenger 215 might have permission to use the vehicle 100 for transportation but not to initiate the movement of the vehicle 100, e.g., by providing input via the HMI 145, which permission may be granted to the privileged passenger 215.

During operation of the vehicle 100, to determine a proper set of permissions for each vehicle 100 user, the computer 110 (see FIG. 1) may authenticate one or more users, e.g., all users present in the vehicle 100 as may be detected using input from one or more sensors 115 as is known. For example, the computer 110 may authenticate a user by receiving authentication information such as a user name and password via HMI 145, biometric authentication information via a camera, or other techniques such as are known. Additionally, the computer 110 may identify a user and/or determine user characteristics (e.g., age) based on the received sensor 115 data using known techniques for such identification, e.g., image recognition. When a user is identified, the computer 110 may determine the role of the specific user, roles having permissions associated therewith, as discussed above. The computer 110 memory may store a table or the like of user identifiers and the role assigned to each user. An administrator 205, e.g., a user assigned a role having permissions to enter new users (potential vehicle occupants) into the system and to assign roles, may provide input to assign a role to each user whose identifier is stored in the memory.

Further, in some implementations, the computer 110 may be programmed to assign a user role based on a determination of one or more user characteristics, e.g., age. For example, users appearing to be twenty years of age or older, but not otherwise identified, could be assigned a privileged passenger 215, while users appearing to be nineteen years of age or younger could be assigned a normal passenger 220.

As another example of user authentication, the computer 110 may compare a voice of a user, i.e., the received audio data from the sensors 115, to voices of known users associated with stored identifiers as explained above, using voice recognition techniques (see FIG. 1). As discussed above, the computer 110 may determine the role to be assigned to the user, e.g., by assigning an age to the user based on analyzing a user's voice, or a role may be assigned according to user input and retrieved when the user is authenticated, e.g., using voice recognition and interactive voice response (IVR), as is known.

Processes

Figure 3:
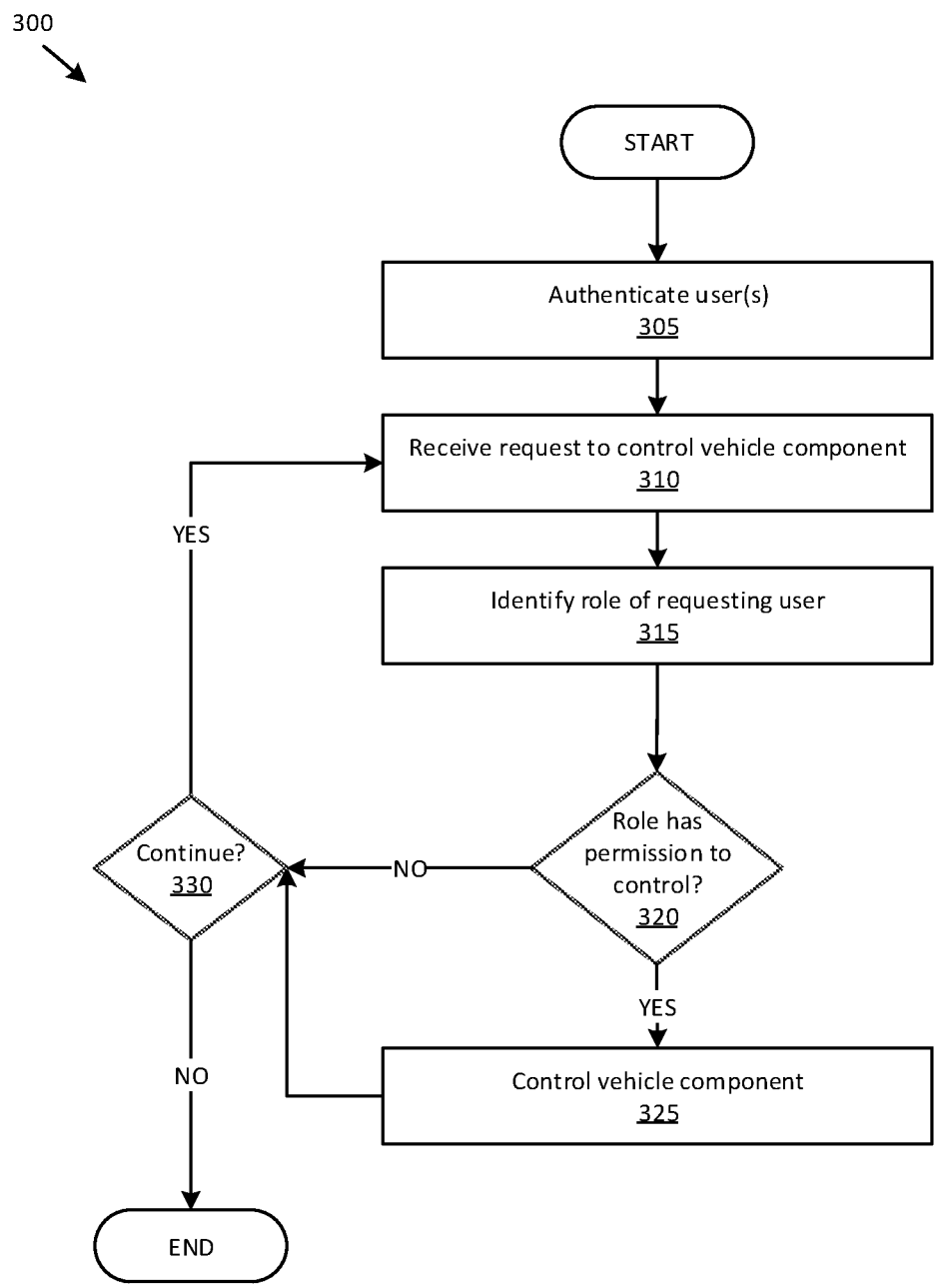
FIG. 3 is a flowchart of an exemplary process for controlling vehicle components according to the roles and permissions of vehicle users.

FIG. 3 illustrates an example process 300 for controlling vehicle components according to the roles and permissions of vehicle users. The vehicle users may include vehicle occupants and/or remote vehicle users (e.g., communicating via a user device 155 and the network 160 with the computer 110). For example, the computer 110 may be programmed according to the process 300 to control vehicle 100 components in accordance with permissions of a vehicle user requesting the respective control.

The process 300 begins in a block 305, in which the computer 110 authenticates a vehicle user, e.g., using input from one or more sensors 115, the HMI 145, etc. Authenticating the user typically includes identifying the user, e.g., according to a specific user name or other unique user identity stored in the computer 110 memory. Alternatively or additionally, authenticating the user could include using known techniques to determine biological characteristics of one or more users in the vehicle 100, e.g., an estimated age.

Next, in a block 310, the computer 110 receives a request to control a vehicle component, e.g., via the HMI 145, the user devices 155, etc. For example, the request to control may include a request to view a destination and a route of the vehicle 100. A request to control could include many other inputs to the computer 110, e.g., a request to authorize an initiation of travel, i.e., to authorize vehicle movement, a request to change a climate control setting, a request to play media via an infotainment system, a request to activate cabin lights, etc.

Next, in a block 315, the computer 110 identifies the role based on the user requesting to control a vehicle 100 component in the block 310. (It is assumed that the user can be identified as a user authenticated in the block 305. If not, the process 300 could end with an output on the HMI 145 that the request cannot be processed.) For example, the computer 110 may determine the role of the authenticated user based on, e.g., a table stored in a memory of the computer 110, including the vehicle 100 user identifiers and the role assigned to each user. Alternatively or additionally, the user could be identified according to a characteristic, such as age, as described above. The permission to initiate a movement of the vehicle 100 will be discussed in greater detail with respect to FIGS. 5A-C.

Next, in a decision block 320, the computer 110 determines, based on the identified role of user, whether user has permission for the requested control. For example, the computer 110 may determine permitted controls of vehicle 100 components for the identified user based on a table stored in a memory of the computer 110, including the roles and the assigned permissions to each role. If the identified user has permission for the requested control, a block 325 is executed next; otherwise, the process 300 proceeds to a decision block 330.

In the block 325, the computer 110 performs the requested control of the vehicle 100 component, e.g., by outputting a signal via the vehicle communication network to a controller 130, an actuator 120, the HMI 145, etc. For example, the computer 110 may output the destination and the route information to the HMI 145 for viewing the information or output a signal to a controller 130 to initiate a travel. Following the block 325 the process 300 proceeds to the decision block 330.

In the decision block 330, the computer 110 determines whether a new request to control a vehicle 100 component is requested. If so, the block 310 is executed next; otherwise, the process 300 ends.

Figure 4:
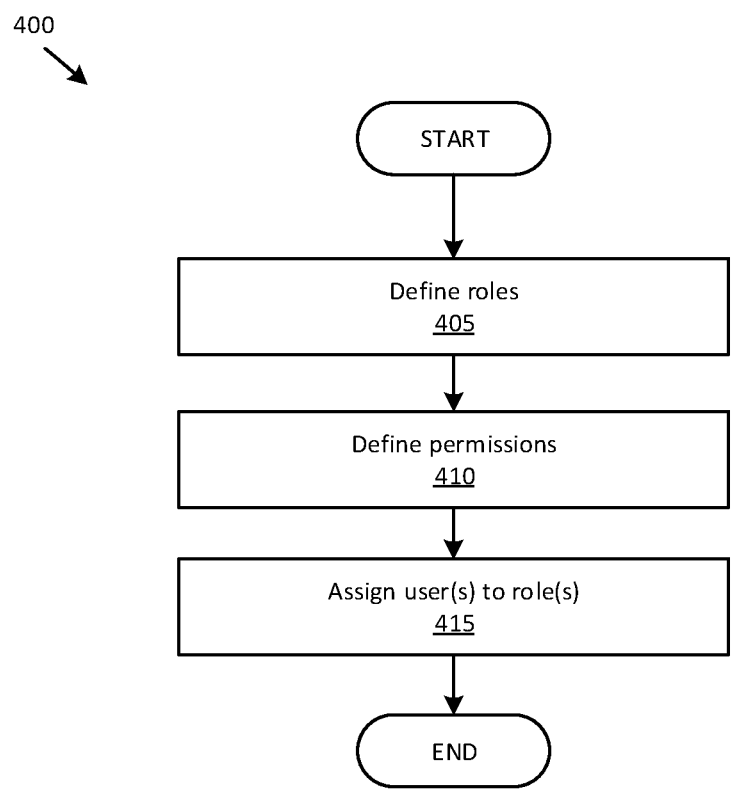
FIG. 4 is a flowchart of another exemplary process for defining roles and associating permissions with the roles FIGS. 5A-5C include a flowchart of an exemplary travel authorization process for an autonomous vehicle.

FIG. 4 illustrates an example process 400 for defining roles and associating permissions with the roles. For example, the computer 110 may be programmed to receive information indicating expected roles, permissions, and user data. For example, a vehicle owner may input this information via the HMI 145, a user device 155, or the server 165. The computer 110 may be programmed according to the process 400 to define roles and permissions, assign permissions to roles, and assign roles to users based on the received information.

The process 400 begins in a block 405, in which the computer 110 defines one or more roles, e.g., super user, privileged passenger 215, etc., and permissions for each role, e.g., based on input from a vehicle owner or other user with administrator 205 access.

Next, in a block 410, the computer 110 stores the roles, i.e., including permissions associated with each role in a memory. Table 1 provides a partial example of roles and associated permissions, e.g., permission to authorize maintenance is assigned to the administrator 205 and super user 210 roles. However, the privileged passenger 215 and the normal passenger 215 roles do not have the permission to authorize maintenance.

Next, in a block 415, the computer 110 assigns users to roles. The users may be identified by user IDs, passwords, or biometric characteristics such as a facial image, voice, or finger print. The computer 110 may store, e.g., a list, in a memory assigning user identifiers to the roles. As an example shown in Table 2, an administrator 205 or a super user 210 may enter a route and assign various users to various segments of the route. A user may have a permission to travel with the vehicle 100 only during one or more specified segments of a route, e.g., a first user may travel with the vehicle 100 only during first, second, and third segments. Whether the first user during the first, second, and third route segments has permission to authorize movement of the vehicle 100 depends on the role of the first user. For example, if the first user is a normal passenger 220, then he/she is not authorized to initiate the movement of the vehicle 100.

Following the block 415, the process 400 ends.

Figure 5A:
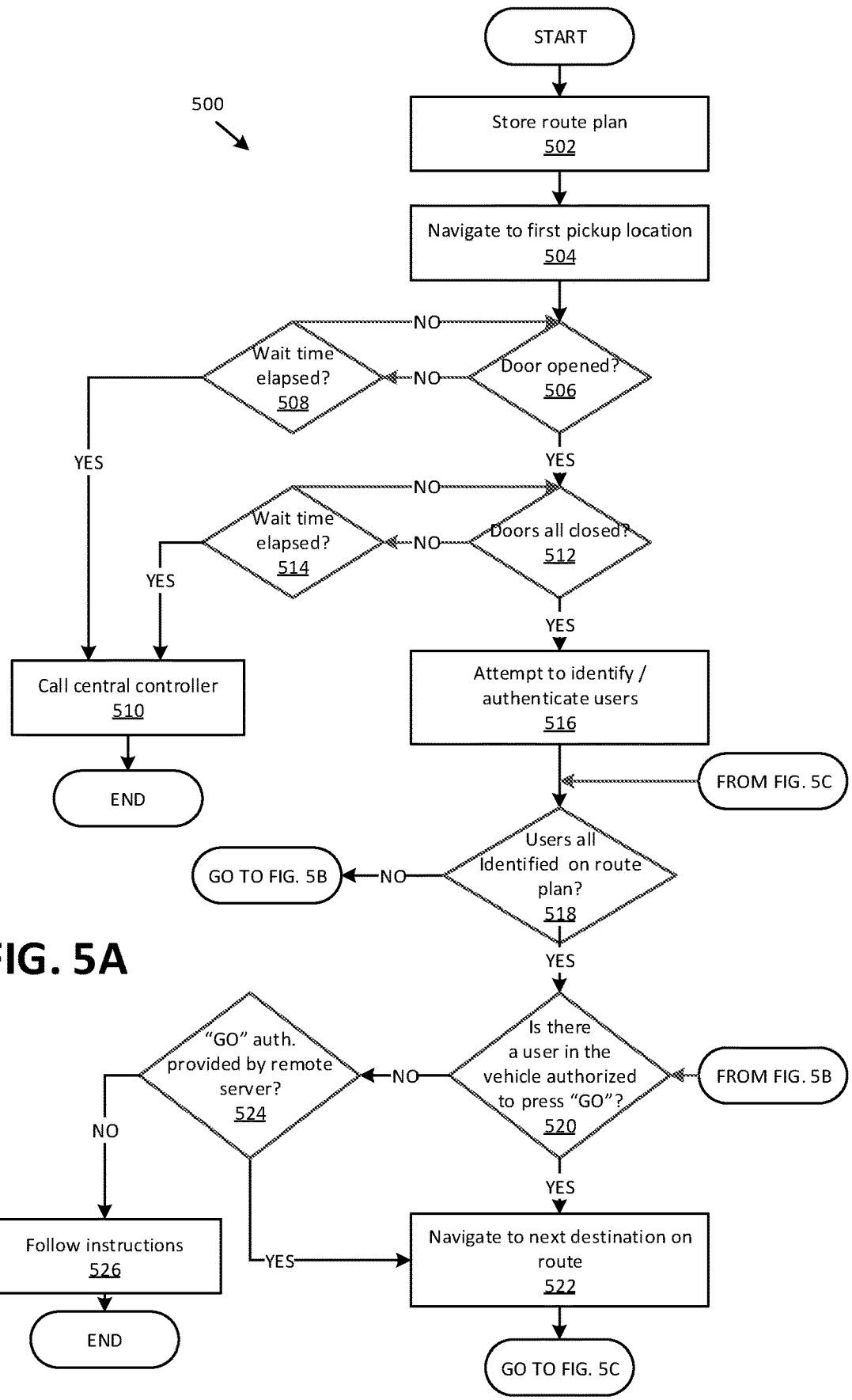
Figure 5B:
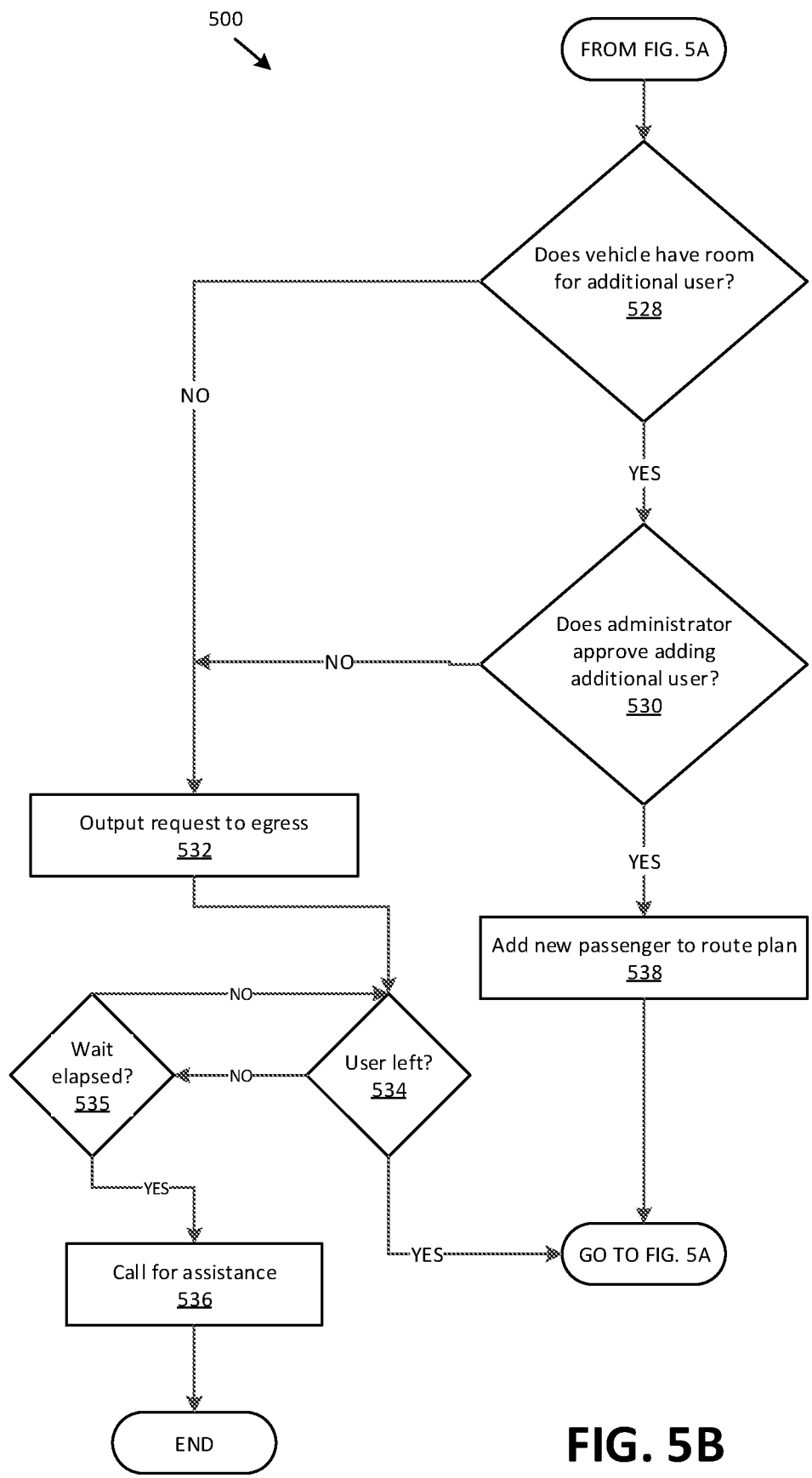
Figure 5C:
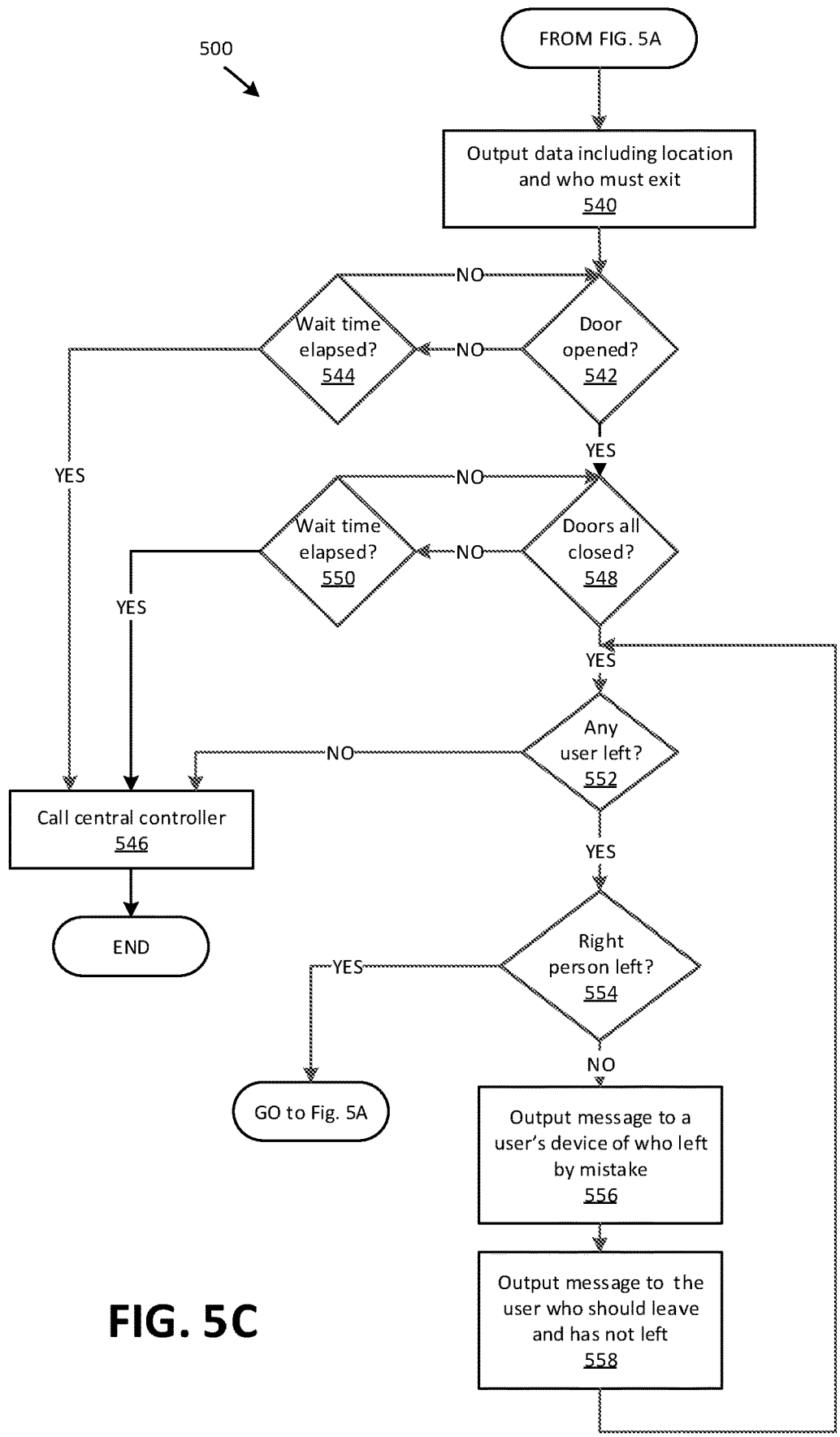

FIGS. 5A, 5B, and 5C together illustrate an example travel process 500 for an autonomous vehicle 100. For example, the computer 110 may be programmed to receive information including user data, control requests, roles, permissions associated with roles, etc. via the sensors 115, the HMI 145, user device 155, and/or the server 165. The computer 110 may be programmed as described with respect to the process 500 to navigate the vehicle 100 on a planned route, authorize or decline user control requests, etc., in accordance with roles, permissions, and the planned route.

With reference to FIG. 5A, the process 500 begins in a block 502, in which the computer 110 stores a route plan such as the example route plan illustrated in Table 2. The route plan may be provided to the computer 110 in a variety of ways, e.g., by the server 165, may be entered into the HMI 145 by a user with the permission to enter/modify a route plan, e.g., a user with the administrator 205 or the super user 210 role, etc.

Next, in a block 504, the computer 110 operates the vehicle 100 to an address associated with the first segment of the route plan, e.g., first address location of Table 2. The address may include GPS coordinates of the start location of the first segment. Alternatively or additionally, the computer 110 may be programmed to receive navigation instructions specific to a first address location from the server 165 or some other computer. For example, a first segment start location may be inside a multistory parking structure. The computer 110 may be programmed to receive special instructions regarding how to navigate inside the building to the start location. In order to navigate the vehicle 100 to the first address location, the computer 110 may output signals to the vehicle subsystem to accelerate, brake, and steer the vehicle 100.

Next, in a decision block 506, the computer 110 determines whether the vehicle 100 door(s) are opened. If the door(s) are opened, a decision block 512 is executed next; otherwise, the process 500 proceeds to a decision block 508.

In the decision block 508, the computer 110 determines whether a predetermined wait time has elapsed since the vehicle 100 arrived at the first address location. If the wait time has elapsed, a block 510 is executed next; otherwise, the process 500 proceeds to the decision block 506. In other words, the computer 110 determines whether the vehicle 100 doors are opened within a predetermined time after the vehicle 100 arrives at the first address.

In the block 510, the computer 110 may notify a central controller of its status (a vehicle 100 status can include a location, a number of occupants, and/or other information), e.g., send a message to the server 165. In this block, the vehicle 100 status would be that it is at a designated location, empty, and one or more expected occupants have not arrived. The computer 110 may receive further instructions from the server 165 regarding how to proceed, e.g., to return to a dispatch center. Following the block 510 the process 500 ends.

In the decision block 512, the computer 110 determines whether the vehicle 100 door(s) are closed. If the door(s) are closed, a block 516 is executed next; otherwise, the process 500 proceeds to a decision block 514.

In the decision block 514, the computer 110 determines whether a predetermined wait time has elapsed since the vehicle 100 doors opened. If the wait time elapsed, the block 510 is executed next; otherwise, the process 500 proceeds to the decision block 512. In other words, the computer 110 determines whether the vehicle doors are closed within a predetermined time after they were opened.

In the block 516, the computer 110 attempts to identify any users in the vehicle 100, e.g., according to known techniques. For example, the computer 110 may receive data from the sensors 115 such as cameras and authenticate the user(s) using biometric data. Alternatively or additionally, the computer 110 may identify the user(s) according to known authentication information such as a user ID and a password.

Next, in a decision block 518, the computer 110 determines whether all the users in the vehicle 100 are identified on the route plan. For example, based on the route plan illustrated in Table 2, the computer 110 expects the first user in the vehicle 100 at a start point of a first segment. If the users identified in the vehicle 100 are as stored in the route plan, a block 520 is executed next; otherwise, the process 500 proceeds to a block 528, as shown in FIG. 5B. If no user is expected for a route segment, e.g., fourth segment of the route plan in Table 2, then an empty vehicle 100 is in accordance with the route plan and therefore the block 520 is executed next.

In the block 520, the computer 110 determines whether a user in the vehicle is authorized to initiate vehicle movement, e.g., push a "Go" button. The computer 110 may determine permissions of users based on roles as described above. If the computer 110 determines that a user in the vehicle is authorized to initiate vehicle movement, a block 522 is executed next; otherwise, the process 500 proceeds to a block 524.

In the block 522, the computer 110 navigates the vehicle 100 to a next destination on the route plan, e.g., the second address location associated with the second segment based on the route plan illustrated in Table 2. The computer 110 navigates the vehicle 100 by outputting signals to vehicle subsystems to accelerate, brake, or steer the vehicle 100. Following the block 522, the process 500 proceeds to a block 540, as shown in FIG. 5C.

In the decision block 524, because the vehicle 100 is empty per preceding process blocks, the computer 110 determines whether vehicle 100 movement is authorized via a remote server such as the server 165, e.g., an authorization initiated by a user with the administrator 205 role. For example, in the example route plan of Table 2, there is no user associated with the fourth segment. Therefore, an authorization from a remote server 165 may initiate the vehicle 100 movement from the first address location. If an authorization to initiate vehicle 100 movement is received from a remote server 165, the block 522 is executed next; otherwise, the process 500 proceeds to a block 526.

In the block 526, the computer 110 receives instructions from the server 165 on how to proceed, e.g., dispatching a technician to the location of the vehicle 100. Following the block 516 the process 500 ends.

Turning to FIG. 5B, in the decision block 528, which can follow the block 518 discussed above with reference to FIG. 5A, the computer 110 determines whether the vehicle 100 has room for extra user(s). For example, the computer 110 may receive information from the server 165 indicating a maximum number of the users allowed in the vehicle 100. The computer 110 may further determine whether the vehicle 100 has room for extra users based on the maximum number of allowed users, a number of already planned users for the current segment, and/or a number of additional users requesting travel with the vehicle 100. If the computer 110 determines that there is room for extra user(s), then a decision block 530 is executed next; otherwise, the process 500 proceeds to a block 532.

In the decision block 530, the computer 110 determines whether an administrator 205 approves or declines adding the user requesting travel to the route plan. Alternatively, a super user 210 may approve an addition of the user(s) requesting travel to the route plan. Administrator 205 or super user 210 can provide input via the vehicle 100 HMI 145 or, alternatively, via the server 165. If the addition of the user(s) to the route plan is approved, a block 538 is executed next; otherwise, the process 500 proceeds to the block 532.

In the block 532, the computer 110 outputs a message to users not listed on the route plan that there is no room and that the user(s) should egress the vehicle 100. For example, the computer 110 may provide such output to the HMI 145 and/or user devices 155.

Next, in a decision block 534, the computer 110 determines whether the users not listed on the route plan left the vehicle 100. If the users not listed on the route plan left the vehicle 100, the block 518 is executed next (see FIG. 5A); otherwise, the process 500 proceeds to a decision block 535.

In the decision block 535, the computer 110 determines whether a wait time after outputting a request to egress has elapsed. If the wait time has elapsed, a block 536 is executed next; otherwise, the block 534 execution continues.

In the block 536, the computer 110 notifies the server 165 of its status, e.g., one or more users not on the route plan decline to exit the vehicle 100. The computer 110 may output further information such as identity of the users declining to exit, the location of the vehicle 100, etc. The computer 110 may receive assistance from the server 165, e.g., the server 165 may notify a law enforcement department.

In the block 538, which may follow the block 530 as described above, the computer 110 adds the additional user(s) to the route plan, i.e., by adding each additional user to one or more segments of the route plan. Following the block 538, the process proceeds to the block 520, as shown in FIG. 5A.

Turning now to FIG. 5C, following the block 522 shown in FIG. 5A, in the block 540, the computer 110 outputs data including a current location and identities of users who must exit the vehicle 100. The computer 110 determines the user(s) who must exit based on the route plan, e.g., the computer 110 outputs data including first and second users to exit at fourth address, i.e., i.e., at the end location of the third segment.

Next, in a decision block 542, the computer 110 determines whether the vehicle 100 door(s) are opened. If the door(s) are opened, a decision block 548 is executed next; otherwise, the process 500 proceeds to a decision block 544.

In the decision block 544, the computer 110 determines whether a predetermined wait time has elapsed since the vehicle 100 arrived. If the wait time has elapsed, a block 546 is executed next; otherwise, the process 500 proceeds to the decision block 542. In other words, the computer 110 determines whether the vehicle 100 doors are opened within a predetermined time after the vehicle 100 arrives at the drop off/pickup address.

In the block 546, the computer 110 may notify a central controller of its status (a vehicle 100 status can include a location, a number of occupants, a moving/not moving state, and/or other information), e.g., send a message to the server 165. In this block, the vehicle 100 status would be that it is at a designated location and one or more users expected to exit have not exited. The computer 110 may receive further instructions from the server 165 regarding how to proceed, e.g., a message to a user device 155 that the user is expected to exit the vehicle. Following the block 546 the process 500 ends. Alternatively, following the block 546, although not shown, the computer 110 may receive further override instruction to continue travelling to further destinations per the route plan, e.g., proceed to the block 518.

In the decision block 548, the computer 110 determines whether the vehicle 100 door(s) are closed. If the door(s) are closed, a block 552 is executed next; otherwise, the process 500 proceeds to a decision block 550.

In the decision block 550, the computer 110 determines whether a predetermined wait time has elapsed since the vehicle 100 doors opened. If the wait time elapsed, the block 546 is executed next; otherwise, the process 500 proceeds to the decision block 548. In other words, the computer 110 determines whether the vehicle doors are closed within a predetermined time after they were opened.

In the decision block 552, the computer 110 determines whether any user left the vehicle 100, e.g., based on data received from cameras and/or other sensors. If any user has left the vehicle 100, a decision block 554 is executed next; otherwise, the process 500 proceeds to a decision block 554.

In the decision block 554, the computer 110 determines whether, based on the route plan listing users for each segment, current location of the vehicle 100, and the identity of the user(s) who left the vehicle 100, an expected user or users have left the vehicle 100. If so, the block 518 is executed next (see FIG. 5A); otherwise, the process proceeds to block 556.

In the block 556, the computer 110 outputs a message to a device 155 of a user who presumably left the vehicle 100 by mistake, e.g., sending a text message asking the user to return to the vehicle 100.

Next, in a block 558, the computer 110 outputs message(s) to the users who should leave but have not left the vehicle 100, e.g., outputting textual and/or audio messages via the HMI 145 and/or user devices 155.

Following the block 558, the process 500 proceeds to the decision block 552.

Processors such as discussed herein generally each include instructions executable by one or more processors such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in stored in a processor is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computer, comprising a processor and a memory, the memory storing instructions executable by the processor to:
    receive input from a first user to initiate movement of a vehicle, wherein the input includes a route plan having one or more route segments, each route segment having a list of authorized users;
    identify the first user;
    determine, based at least on the input, a permission associated with a role assigned to the first user, and an identification of the first user on the list of authorized users for a current route segment, to initiate movement of the vehicle; and
    initiate movement of the vehicle.

2. The computer of claim 1, wherein initiating movement of the vehicle is further based in part of one or more characteristics of a second user in the vehicle.

3. The computer of claim 1, wherein the computer is further programmed to determine that the first user is authorized to initiate movement of the vehicle based on an input from a remote server in wireless communication with the vehicle.

4. The computer of claim 1, wherein the vehicle is located at a start location of a route segment, and the computer is further programmed to determine whether all users in the vehicle at the start location are authorized users for the route segment.

5. The computer of claim 1, wherein the first user is outside of the vehicle.

6. The computer of claim 1, wherein the list of authorized users includes zero or more user identities associated with the respective route segment.

7. The computer of claim 1, wherein a respective start location is associated with each of the one or more route segments.

8. The computer of claim 1, wherein the vehicle is located at a start location of a route segment, and the computer is further programmed to:
    identify a second user in the vehicle;
    determine that the second user is not an authorized user for the route segment; and
    add the second user to the route plan having the list of authorized users for the route segment in response to receiving an authorization from a remote server in wireless communication with the vehicle.

9. The computer of claim 8, wherein the computer is further programmed to decline an addition of the second user to the route plan in response to one or both of a declination of authorization of the second user from the remote server and a determination that the vehicle lacks room for the second user.

10. The computer of claim 1, wherein the computer is further programmed to output an exit request message to a device including a location data and an identifier of a second user that is expected to exit in response to arrival of the vehicle at the location, wherein the computer determines whether the second user is expected to exit based on the list of authorized users of each route segment included in the route plan.

11. The computer of claim 10, wherein the computer is further programmed to output a message to a device including a location data and an identifier of a third user that exited the vehicle unexpectedly, wherein the computer determines whether the third user exited unexpectedly based on the list of authorized users of each route segment included in the route plan.

12. A method, comprising:
    receiving input from a first user to initiate movement of a vehicle, wherein the input includes a route plan having one or more route segments, each route segment having a list of authorized users;
    identifying the first user;
    determining, based at least on the input, a permission associated with a role assigned to the first user, and an identification of the first user on the list of authorized users for a current route segment, to initiate movement of the vehicle; and
    initiating movement of the vehicle.

13. The method of claim 12, wherein initiating movement of the vehicle is further based in part on one or more characteristics of a second user in the vehicle.

14. The method of claim 12, wherein the input is received in a vehicle controller, and determining that the first user is authorized to initiate movement of the vehicle is performed by a remote server in wireless communication with the vehicle.

15. The method of claim 12, wherein the vehicle is located at a start location of a route segment, and determining to initiate movement of the vehicle includes determining that all users in the vehicle at the start location are authorized users for the route segment.

16. The method of claim 12, wherein the first user is outside of the vehicle.

17. The method of claim 12, further comprising:
    arriving at an end of a route segment; and
    outputting an exit request message, to a device, including location data and an identifier of a second user that is expected to exit, wherein the computer determines whether the second user is expected to exit based on the list of authorized users of each route segment included in the route plan.

18. The method of claim 12, wherein the vehicle is located at a start location of a route segment, further including:
    identifying a second user in the vehicle;
    determining that the second user is not an authorized user for the route segment; and
    adding the second user to the route plan having the list of authorized users for the route segment in response to receiving an authorization from a remote server in wireless communication with the vehicle.

19. The method of claim 18, further comprising declining an addition of the second user in response to one or both of a declination of authorization of the second user from the remote server and a determination that the vehicle lacks room for the second user.

\* \* \* \* \*